United States Patent
Waite et al.

(10) Patent No.: US 12,280,541 B2
(45) Date of Patent: Apr. 22, 2025

(54) APPARATUS AND METHODS FOR DISPENSING POWDER

(71) Applicant: ALCHEMIE TECHNOLOGY LIMITED, Cambridge (GB)

(72) Inventors: Jonathan Waite, Cambridge (GB); Simon Kew, Cambridge (GB); Alan Hudd, Cambridge (GB)

(73) Assignee: ALCHEMIE TECHNOLOGY LIMITED, Cambridge (GB)

( * ) Notice: Subject to any disclaimer, the term of this patent is extended or adjusted under 35 U.S.C. 154(b) by 319 days.

(21) Appl. No.: 17/296,060

(22) PCT Filed: Nov. 15, 2019

(86) PCT No.: PCT/GB2019/053255
§ 371 (c)(1),
(2) Date: May 21, 2021

(87) PCT Pub. No.: WO2020/104775
PCT Pub. Date: May 28, 2020

(65) Prior Publication Data
US 2022/0016831 A1    Jan. 20, 2022

(30) Foreign Application Priority Data
Nov. 23, 2018   (GB) ..................... 1819101

(51) Int. Cl.
*B05B 7/14*     (2006.01)
*B05B 17/00*    (2006.01)
(Continued)

(52) U.S. Cl.
CPC .......... *B29C 64/165* (2017.08); *B05B 7/1486* (2013.01); *B05B 17/0607* (2013.01);
(Continued)

(58) Field of Classification Search
CPC ... B29C 64/165; B29C 64/209; B29C 64/255; B29C 64/268; B05B 7/1486;
(Continued)

(56) References Cited

U.S. PATENT DOCUMENTS

2003/0178507 A1* 9/2003 Maria Rijn Van ...........................
B01F 23/23105
239/337
2004/0055598 A1* 3/2004 Crowder ........... A61M 15/0045
128/203.15
(Continued)

FOREIGN PATENT DOCUMENTS

CN    202862819 U    4/2013
EP    3042772 A1     7/2016
(Continued)

OTHER PUBLICATIONS

ISR-WO for parent PCT application No. PCT/GB2018/053255.
(Continued)

*Primary Examiner* — Qingzhang Zhou
(74) *Attorney, Agent, or Firm* — Vorys, Sater, Seymour and Pease LLP

(57) ABSTRACT

Apparatus and associated methods are provided for digitally controlled powder deposition. The apparatus comprises a supply chamber configured to maintain a reservoir of powder in a fluidised state, and one or more dispenser elements. The supply chamber is further configured to direct a flow of the fluidised powder from the reservoir to an orifice, causing it to be dispensed from the orifice.

12 Claims, 8 Drawing Sheets

(51) Int. Cl.
*B05B 17/06* (2006.01)
*B29C 64/165* (2017.01)
*B29C 64/209* (2017.01)
*B29C 64/255* (2017.01)
*B29C 64/268* (2017.01)
*B33Y 10/00* (2015.01)
*B33Y 30/00* (2015.01)
*B33Y 40/10* (2020.01)
*B33Y 40/20* (2020.01)

(52) U.S. Cl.
CPC ........ *B05B 17/0646* (2013.01); *B29C 64/209* (2017.08); *B29C 64/255* (2017.08); *B29C 64/268* (2017.08); *B33Y 10/00* (2014.12); *B33Y 30/00* (2014.12); *B33Y 40/10* (2020.01); *B33Y 40/20* (2020.01)

(58) Field of Classification Search
CPC . B05B 17/0607; B05B 17/0646; B33Y 10/00; B33Y 30/00; B33Y 40/10; B33Y 40/20; G03G 15/224; G03G 15/225; G03G 15/0865; G03G 15/346; G03G 15/0877
See application file for complete search history.

(56) References Cited

U.S. PATENT DOCUMENTS

| | | |
|---|---|---|
| 2009/0014916 A1 | 1/2009 | Nagai et al. |
| 2017/0120604 A1 | 5/2017 | Seo et al. |
| 2018/0264551 A1 | 9/2018 | Ishikawa et al. |

FOREIGN PATENT DOCUMENTS

| | | | |
|---|---|---|---|
| EP | 3135407 A1 * | 3/2017 | ............. B22F 10/00 |
| GB | 2546016 A | 7/2017 | |
| GB | 2567877 A | 5/2019 | |
| JP | H05 330666 A | 12/1993 | |
| JP | H11208891 A * | 8/1999 | |
| WO | 2009/147619 A1 | 12/2009 | |
| WO | 2020/104775 A1 | 5/2020 | |

OTHER PUBLICATIONS

Search and examination report for parent application No. GB1819101.5.

CN OA dated Jan. 24, 2024 and citing US2018/0264551 as a reference.

* cited by examiner

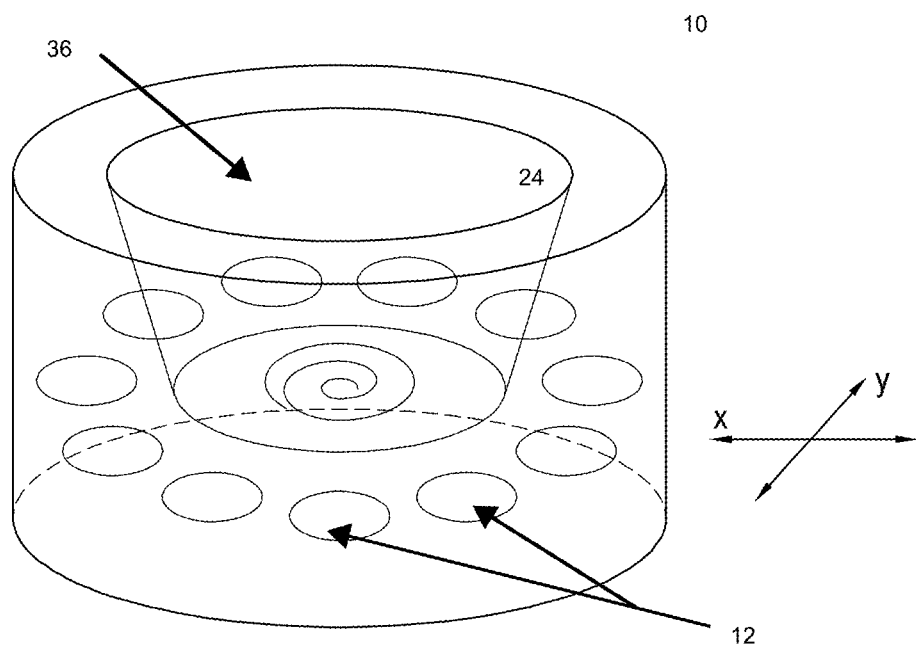
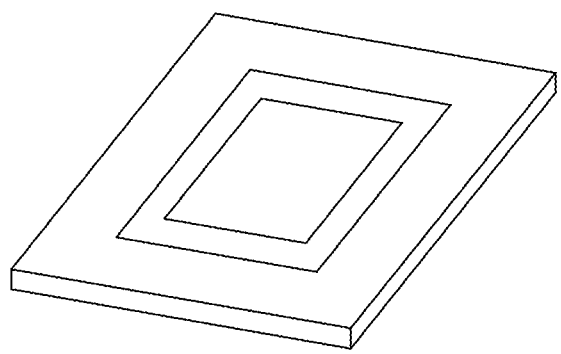
Fig. 8

APPARATUS AND METHODS FOR DISPENSING POWDER

Powder transport and delivery is a widespread need in industry and there are well established methods for the delivery of powder using energy of various sources. Examples are ultrasonic sieving technologies, vibratory conveyers and air-flow fluidisation techniques. These approaches are generally applied on a bulk kilogram scale in industrial processing.

Powders are also deposited electrostatically, for example in powder coating or laser printing systems (xerography). This enables the deposition of micron thickness powder layers onto a wide variety of substrates using electrical charges to transfer powders between locations.

Powders can also be dosed using Auger screw powder transport systems.

Powders are also dispensed on a milligram to gram scale in the fabrication of tablets and capsules in the pharmaceutical industry. There are a number of well-known techniques used for high accuracy and throughput capsule filling and tabletting.

However, powder dispensing on the microgram to milligram scale is significantly more challenging. A key industrial example is the use of respiratory inhalers, where small milligram scale masses of powders are dispensed to the lungs using an airflow. However, the powder dosing techniques used for respiratory dosing are unlikely to be suitable for deposition of powders onto substrates for industrial applications such as decorative and functional coatings.

The present invention has arisen in this context and incorporates an array of electronically controlled powder dosing elements, which when operated together comprise a powder printhead. The plurality of dosing elements enables a range of new industrial applications ranging from decorative imaging to pharmaceutical dose dispensing.

The powder printhead design of the present invention may comprise several key elements:
1. A fluidised powder supply
2. A chamber in contact with the dispensing element where powder is fluidised with a controlled energy
3. A digitally controlled dispenser element that doses powder using additional energy imparted by a piezo electric actuator
4. A software control system that converts an image or pattern into discrete signals for energising an array of piezo actuator dispense elements The powder dispensing printhead is designed to dispense digitally defined 2D images via the deposition of a patterned layer or powder.

The powder dispensing printhead is also designed to enable precisely controlled filling of cavities with powder, for example pharmaceutical capsules or blister packs.

Powders are the functional element of many functional and decorative coatings. However, direct printing of powders is technically challenging and typically, printing powders relies on a carrier fluid to enable transport of the material to the substrate.

Although laser printing (xerography) has established the principle of electrostatic deposition of micronised powders, this technique places stringent demands on the powder properties, which means that very few powders can be printed using the technique. We have solved this problem by developing a dose-on-demand powder printhead that utilises digitally controlled piezoelectric actuation to transport powder from a fluidised powder reservoir to a substrate via a discrete dispenser element.

We have previously disclosed the principle of on-demand powder dispensing using single element piezoelectric dispensers, however it was not possible to configure these systems as a printhead, or array of dispensers, due to powder "locking" and compaction in the feed system. Furthermore, these single element dispensers were not sufficiently miniaturised for formation of a close-packed array of at least ten elements per inch. The objective of a printhead is to deliver two-dimensional arrays of deposition actuations for extended periods, suitable for use in manufacturing. In this application we disclose a novel printhead design for the digital on-demand deposition of powders, which uses powder fluidisation techniques to feed a plurality of piezo dispenser elements to deliver two-dimensional powder printing or dispensing.

The inventive step in this application is the connection of an energy-controlled fluidised or agitated powder feed system to a piezoelectric dispenser to create an integrated powder printhead. It was determined that by controlling the energy of fluidised and/or agitated powders, that feed a range of different piezo-actuated dispenser elements, it was possible to use the dispenser element to meter powder dosing for extended time periods.

To date, it has not been possible to dispense powders on-demand, in a comparable fashion to drop-on-demand inkjet printing. In this application, we disclose a powder printhead design that utilises the principles of digital drop-on-demand inkjet to dispense microgram quantities of powder to deliver 2D patterning, imaging and dispensing into 2D arrays of cavities. This technology can be applied for industrial coatings of construction materials, decorative laminates, paper and non-woven products, foodstuffs, pharmaceutical doses and electronics and optical coatings. It is also likely that this approach has applications in 3D printing based on layer-by-layer build-up of patterns. A further key application is in the filling of cavities such as capsules for pharmaceutical dosage forms. These and other applications of embodiments of the present invention are set out in more detail in the detailed description section.

The invention disclosed is based on the combination of a fluidised powder reservoir of controlled energy and a piezo-actuated dispensing element which imparts additional energy at the dispense orifice. The invention is based on the insight that only by controlling the energy of fluidised material in the reservoir, is it possible to use the additional energy from a piezo actuator to meter dosing using a dispenser element in contact with a powder reservoir.

According to the present invention there is provided a dispenser element comprising a piezo actuator and an orifice through which fluid is dispensed, wherein the dispenser element is configured to provide sufficient resistance to powder flow to ensure that mass transport commences only when the piezo actuator is energised.

For example, powders with an angle of repose>30° are static in the dispenser element without the application of ultrasonic agitation.

The dispenser element may be configured to provide energy to the powder in proximity to the dispenser element such that powder flow occurs. The energy may be provided to the powder via high frequency mechanical vibrations of the piezo actuator. Alternatively, or additionally, the vibrations may be ultrasonic. Alternatively, or additionally, the energy may be provided via a direct mechanical connection between the piezo actuator and the orifice. The energy delivered may be at a frequency in the range 1-500 kHz and the power delivered may be in the range of 1 to 1000 milli watts.

The dispenser element may further comprise a conduit configured to transmit the mechanical vibrations of the piezo actuator to the powder. The conduit may be configured to be a tube, a trough or an array of holes in a sieve.

Alternatively or additionally, the powder may be dispensed under the influence of gravity.

The orifice may be an array of holes in a plate which may be commonly referred to as a mesh. Alternatively, or additionally, the orifice may a straight sided cylinder. The orifice may alternatively be embodied as a taper or a screw form.

The dispensing element may further comprise a cone-shaped pipe configured to provide fluidised powder to be dispensed to the orifice.

An array of the above mentioned dispensing elements may be combined to form a powder printhead.

The powder printhead may further comprise an energy-controlled fluidised powder supply chamber, and may be configured to dispense powder on demand through the dispensing elements. The supply chamber may include one or more of the following to fluidise the powder to be dispensed: a mechanical agitator; an air pump and/or an ultrasonic actuator.

The powder printhead may further comprise an orifice through which the powder is dispensed. The orifice may be in the range 50-1000 microns; 100-500 microns, for example 500 microns. The size of the orifice will be influenced, at least in part, by the size of the powder to be dispensed. The powders of interest are in the range of 10 to 200 micron in mean diameter. The orifice is selected to have a diameter of at least five times the mean diameter of the particle to be dispensed.

The powder supplied to the printhead remains substantially fluidised while in the chamber that supplies the dispenser elements. The fluidisation is maintained by continuous control using one or more of the mechanisms described above. Furthermore, the pressure in the supply chamber may be controlled to be within the range 1-6 bar.

Furthermore, according to the present invention there is provided a method of printing using a powder printhead as described above wherein the step of printing is immediately followed by a technique to fix the deposited powder. The fixing technique may be selected from a group including laser heating; IR radiation heating; UV curing and consolidation by the application of a fluid.

The step of printing may be repeated such that multiple 2D patterned powder layers are deposited. The 2D layers can be combined to produce a 3D form.

The step of printing is preceded by a step of fluidising the flow of powder to be printed. The fluidisation step takes place using one or more of the following mechanisms: air flow; ultrasonic energy and mechanical agitation.

The present invention will now be described, by way of example only, with reference to the accompanying drawings in which:

FIG. 8 shows an alternative example configuration of the apparatus of the present invention suitable for depositing powder decoratively;

Figure 1:
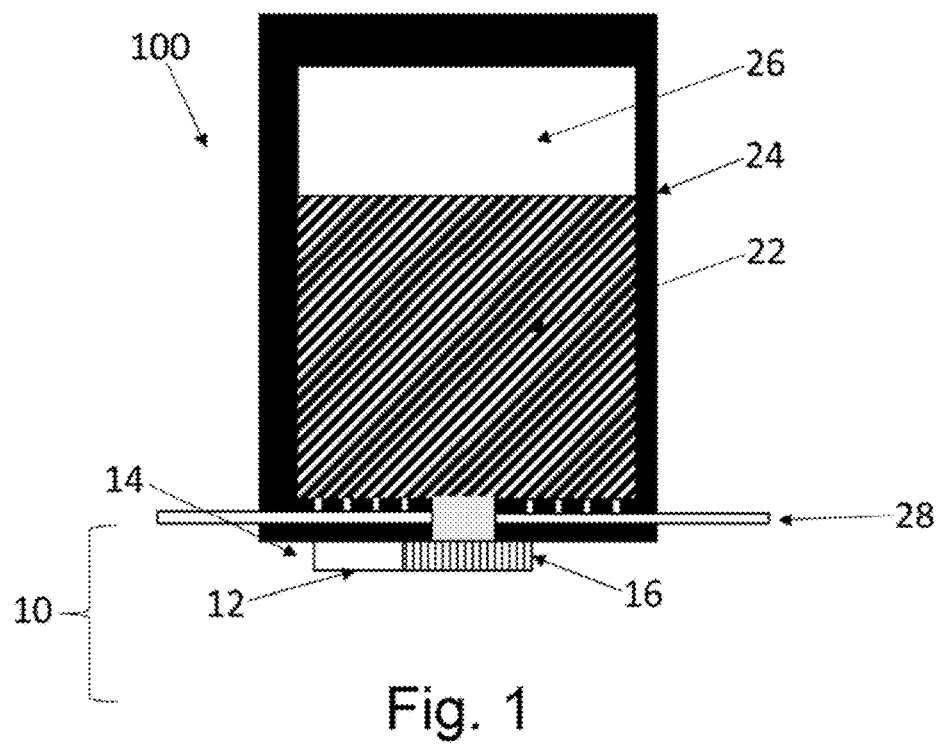
FIG. 1 shows a side view of a printhead including an array of powder dispenser elements.

FIG. 1 shows a side view of an array of powder dispenser elements 10, forming part of a printhead 100. The powder to be dispensed is incorporated in a fluidised powder bed 22 which is confined within a chamber 24. Above the fluidised powder bed 22 there is a gas head space 26. To maintain the powder in its fluidised form there is a fluidising air flow 28 which can be applied continuously, or periodically, as required. The gas head space 26 arises as a result of flowing gas through the powder to fluidise it. The extent to the gas head space 26 will depend on the application and in some embodiments it may be minimal or even absent.

In other examples, not separately illustrated, the air flow 28 can be replaced or augmented by a mechanical agitator for stirring the fluidised bed and/or an ultrasonic vibration source that is coupled to the fluidised bed and capable of imparting vibrations to the fluidised bed 22 to maintain the homogeneity of the bed 22. The advantage of a homogeneous bed is that it avoids segregation of the particles from the fluidised powder, which can negatively impact on the metering of the powder. The homogeneous bed enables control of powder availability and ensures free flowing powder transport.

The dispenser element 10 includes a digitally controlled piezoelectric transducer 12 which is used as an actuator. The piezoelectric transducer 12 applies an electrical pulse 14 across a 2D array of orifices 16 through which the powder is dispensed. In some embodiments, an array of such piezoelectric transducers are used. The increased control of the powder flow provided by the homogeneous bed of fluidised powder enables the implementation of this precise dispensing method without risk of "locking" and compaction in the feed system.

Figure 2:
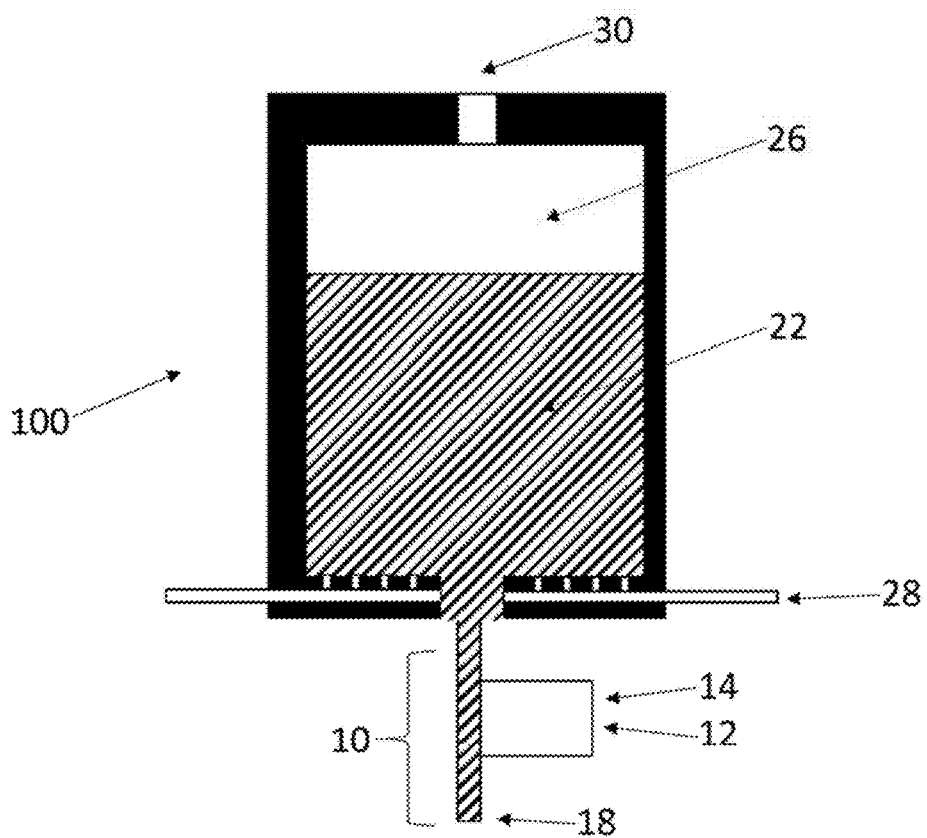
FIG. 2 shows a side view of an alternative printhead including an array of powder dispenser elements.

FIG. 2 shows a side view of a further printhead 100 including an array of powder dispenser elements 10. The powder to be dispensed is incorporated in a fluidised powder bed 22 which is confined within a chamber 24. Above the fluidised powder bed 22 there is a gas head space 26. To maintain the powder bed 22 in its fluidised form there is a fluidising air flow 28 which can flow continuously, or periodically, as required. In addition, an outlet 30 is provided above the gas head space 26. The outlet 30 enables the equalisation of pressure between the chamber 24 and the rest of the printhead 100.

The dispenser element 10 includes a piezoelectric transducer 12 which is used as an actuator. The piezoelectric transducer 12 applies an electrical pulse 14 across a flow channel 18 that provides a tube through which the fluidised powder to be dispensed flows, in use.

Although the outlet 30 is shown only in FIG. 2, it would be apparent to the skilled man that this could also be applied to the printhead illustrated in FIG. 1.

Figure 3:
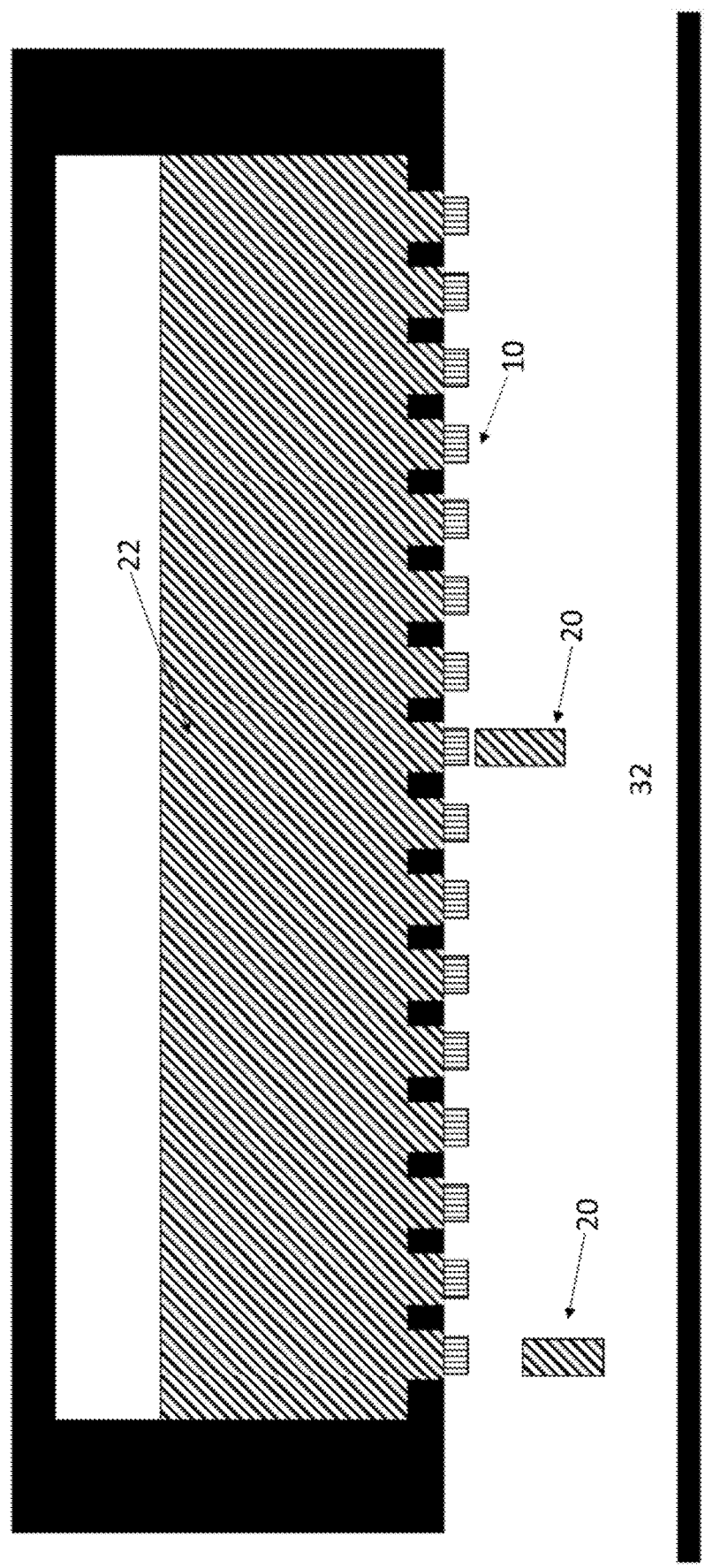
FIG. 3 shows a front view of an array of powder dispenser elements in a powder printhead.

FIG. 3 shows a front view of an array of powder dispenser elements in a powder printhead 100. There are sixteen orifices through which powder 20 can be dispensed. Each orifice is provided with a dispenser element 10 which may be configured as a simple tube, trough or sieve. The fluidised powder bed 22 is held within supply chamber 24 above the dispenser elements 10. There may be a sieve (not shown) between the fluidised bed 22 and the dispenser elements 10 in order to exclude any particles that are too large to be effectively dispensed and which may compromise the integrity of the dispenser element that attempts to dispense them.

The printhead 100 is positioned above a substrate 32 onto which the powder is to be dispensed. The substrate 32 can be paper, fabric or it can be a capsule into which pharmaceutical products are to be dispensed. Each of the dispenser elements 10 is individually controllable, with the printhead having an array of piezoelectric actuators configured to be able to cause powder to be dispensed from either a single dispenser element or multiple dispenser elements, and a controller (not illustrated) configured to digitally control the actuation of said piezoelectric actuators. This enables image creation, for example, on a paper substrate 32, as different dispenser elements can be configured to dispense differing amounts of the powder. In the case of pharmaceutical products, the separate control element enables patient specific doses to be prepared by controlling the mass of powder dispensed.

Figure 4:
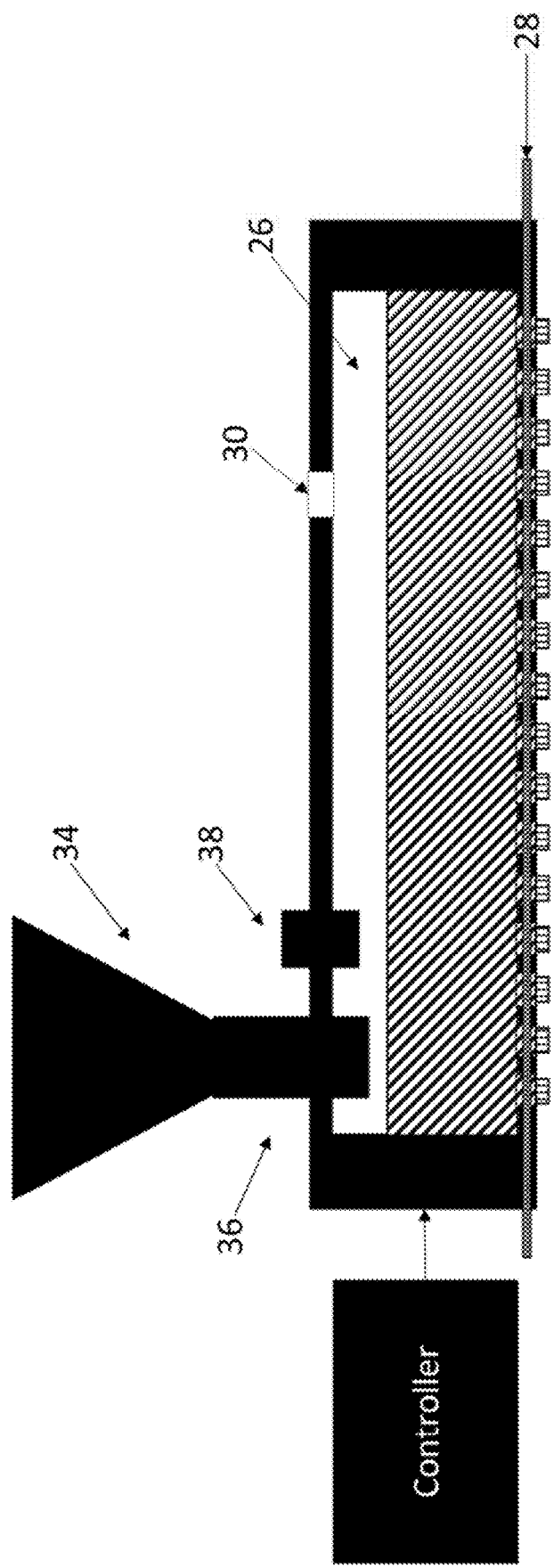
FIG. 4 shows control system deployed in conjunction with the printhead.

FIG. 4 shows a control system deployed in conjunction with the printhead 100. A controller is used in conjunction with the printhead 100, to control the functioning of the printhead 100. The printhead 100 is also provided with a powder feeder 34, a screw feeder 36 and a level sensor 38. The controller controls the weight of powder introduced into the chamber by the powder feeder 34 in order to control the density of the powder 20 within the fluidised powder bed 22 and thereby control the amount of powder that is dispensed with each actuation of each dispenser element 10. The screw feeder 36 enables dispensed powder to be replaced by a new feed.

Figure 5:
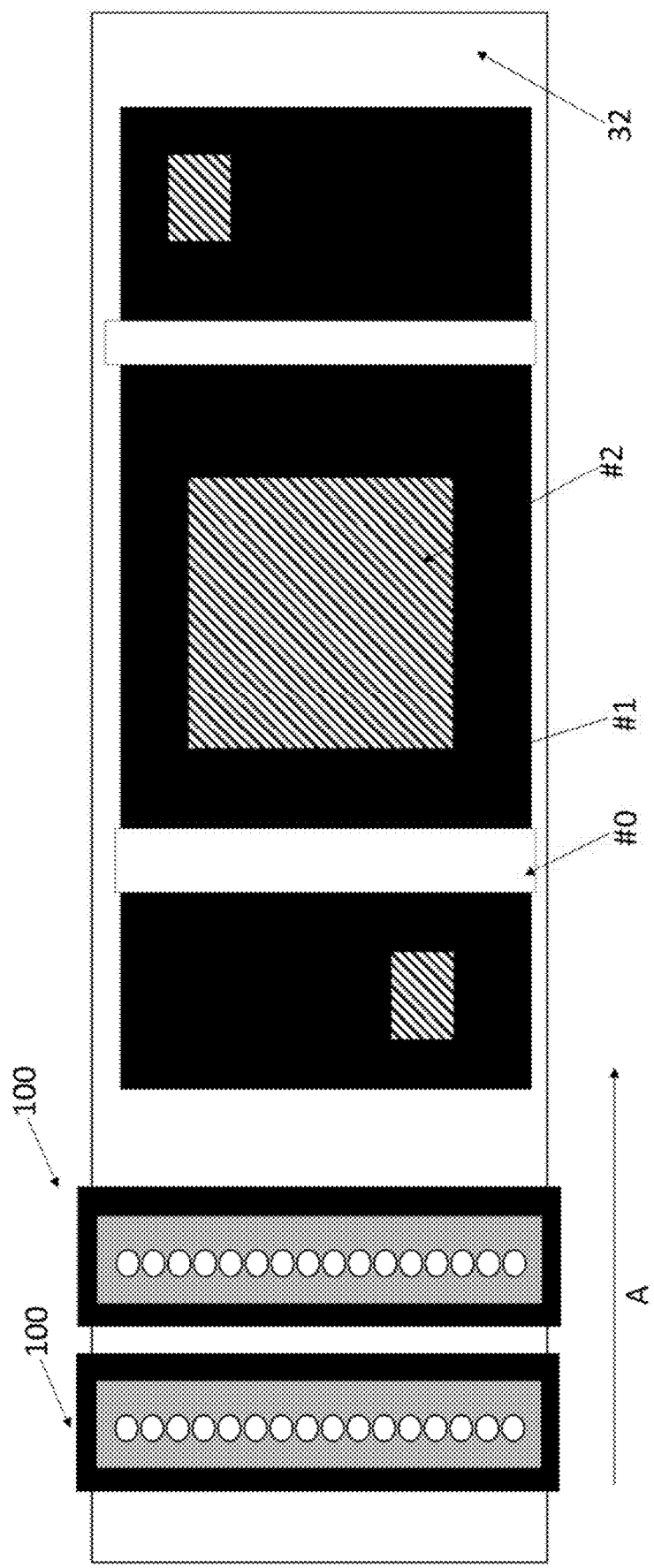
FIG. 5 shows a top view of a printing system including two printheads as illustrated in one or more of FIGS. 1 to 4.

FIG. 5 shows a top view of a printing system including two printheads as illustrated in one or more of FIGS. 1 to 4. There are two powder printheads 100 moving over a substrate 32. The direction of travel is marked A. In some embodiments the substrate moves and the printheads remain stationary. In other embodiments the substrate remains stationary and the printheads move relative to the substrate. The black areas illustrate areas where a first powder #1 has been deposited and the hatched areas illustrate areas where a second powder #2 has been deposited. The white areas #0 show parts where no powder has been deposited.

Figure 6:
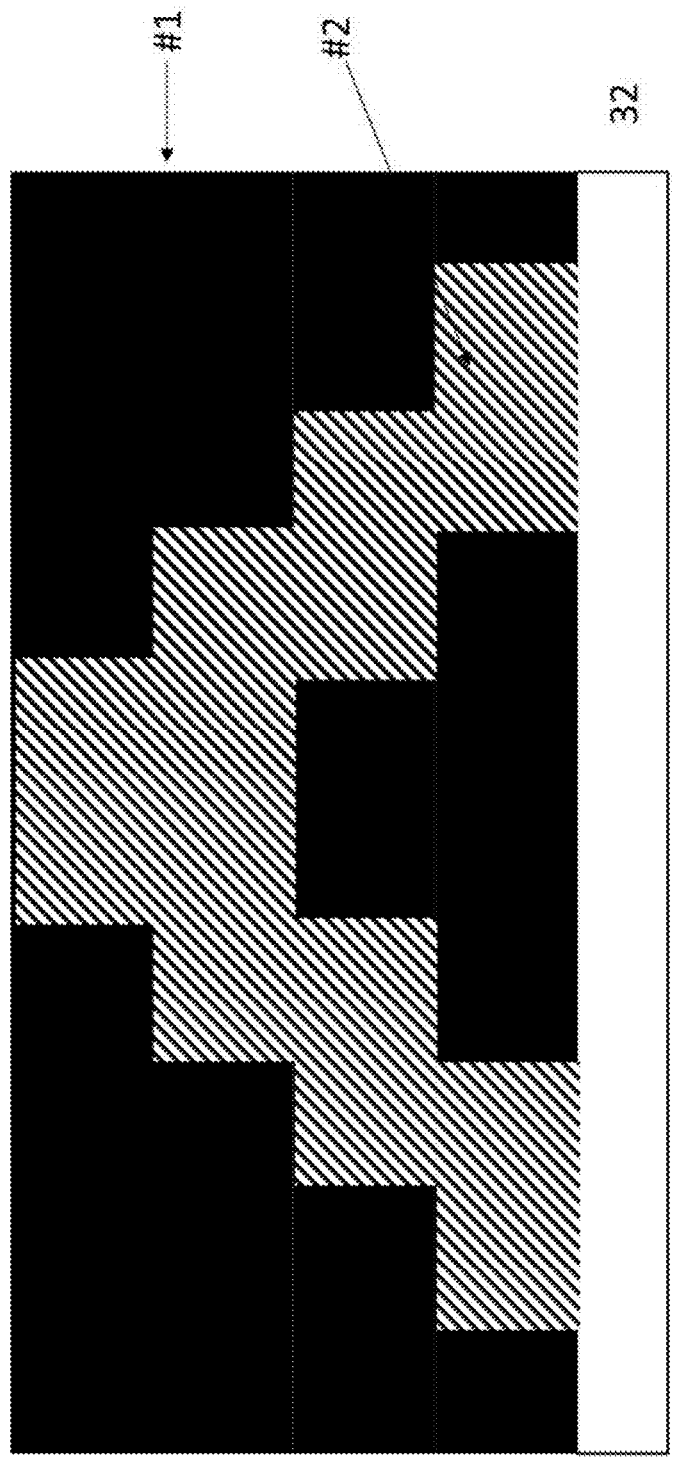
FIG. 6 shows a side view of a 3D object built up using a multi-pass powder printing technique.

FIG. 6 shows a side view of a 3D object built up using a multi-pass powder printing technique. This example application of the disclosed apparatus, involving layer-by-layer digital powder bed deposition, is useful in the industry of additive manufacture/3D printing.

3D printing technologies such as selective laser sintering (SLS), high speed sintering (HSS), and selective laser melting (SLM) are dependent on the capability to dispense powder layers in a layer-by-layer sequence. These methods utilise patterning techniques to selectively fuse powder particles in a layer-by-layer build-up to fabricate three dimensional shapes in polymers and metals.

Deposition of powder layers is conventionally achieved by scraping or rolling the powder layer and is limited to particles having diameters greater than 50 microns, and also requires direct contact with the powder bed.

Advantageously, the disclosed apparatus enables digitally controlled, layer-by-layer deposition of powders using particles having diameters of less than 50 microns, enabling higher part resolution, and without making contact with the preceding powder layer. The digital controlled nature of the apparatus enables the layer thickness to be controlled by mass.

The layer-by-layer powder bed deposition method and apparatus will now be described in more detail.

An initial step in the method comprises applying a single short pulse, for example 50 kHz frequency for 20 milliseconds, of actuation to the reservoir of powder to be dispensed in order to fluidise the supply. This step is performed prior to dispensing each layer of powder and is performed off the build bed since some powder may be dispensed in the set-up pulse Subsequently, a rectangular dispenser is passed over a 3D printer build-bed container and moved along a predetermined path while at the same time dispensing layers of powder for 3D printing in a manner as described below.

The dispenser (not illustrated) is 50 cm in length and comprises an assembly of piezoelectric actuators mounted to an active element. The active element of the dispenser, which causes powder contained therein to be deposited, and which is actuated by the piezoelectric assembly, comprises two strips of stainless steel, each 0.6 mm thick, 23 mm deep and located 10 mm apart from each other. The strips are bridged by a strip of woven steel mesh, the mesh having 2 mm overlap with each strip, being bonded to the strips with epoxy adhesive and having a pore size suited to the powder, e.g. 50 micrometres.

Each steel strip is mounted along its length with an array of PZT discs, each 15 mm in diameter and 0.15 mm thick, which are mechanically bonded to it. The PZT discs have an electrode on their uppermost surface, and are all separately electrically connected to a driving voltage source. In some embodiments the electrodes may also be jointly connected to a voltage source.

The active element is held in place by silicone blocks to allow free vibration. In particular, the edges of the element are held between blocks of silicone with an overlap of e.g. 1 mm. The dispenser apparatus comprises a hopper located above the active element, containing the powder to be dispensed (e.g: BASF Adsint TPU 90 flex TPU powder, Danthane Powder (DanQunisa Gmbh)). The walls of the hopper are perforated with a pattern of small holes, e.g. 0.2 mm diameter holes in a square grid with 10 mm spacing. Inside the hopper walls is a volume filled with pressurised air, e.g. 2 bar, that is sealed besides the perforations in the hopper walls. The hopper is in contact with and adhered to the active element with epoxy adhesive. The hopper is constructed from stainless steel with a thickness of 0.15 mm.

The powder has a D90 of around 10 micrometres. The powder is preferably a metal or metal alloy, such as grade 5 titanium. The powder layer can be varied digitally by altering the driving voltage waveform applied to the piezo actuators. This may be combined with a measurement of the height of the layers that have been deposited thus far to ensure maintenance of the desired powder layer thickness.

The powder is periodically replenished from a large hopper while the dispenser is at one end of its predefined path of travel. The dispenser is positioned close to but not touching the top of the container to be filled, e.g. within 1 mm.

The 3D printer build-bed container has a floor which can be raised or lowered and starts at the top of the container. The floor of the build-bed container is lowered by the height of each layer after deposition.

While travelling, the dispenser is activated, and powder is deposited into the container. The parameters of the signal driving the dispenser are such that the powder accurately fills the new space in the container.

The metal powder is then fused using a laser to selectively melt powder used for the final part using the method of selective laser sintering (SLS). An energy beam or printed binder may also be used to selectively fuse areas of the powder.

The process repeats, with the dispenser travelling in the opposite direction a layer or powder is dispensed onto the substrate.

FIG. 6 illustrates four passes, each creating a separate layer of deposited powder. These are shown as pass 1, pass 2, pass 3 and pass 4. The areas where the first powder #1 has been deposited are shown in black and the areas where the second powder #2 has been deposited are shown with hatching. As will be apparent, this enables a three dimensional shape to be created.

Figure 7A:
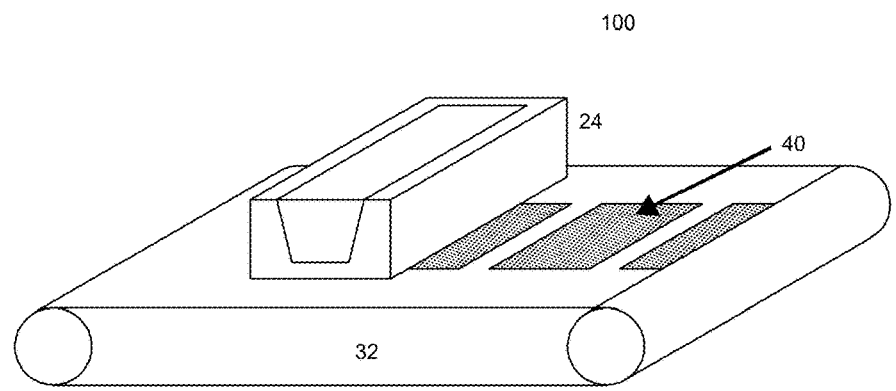
FIG. 7A shows an example printhead apparatus according to the present invention dispensing powder onto a substrate.
Figure 7B:
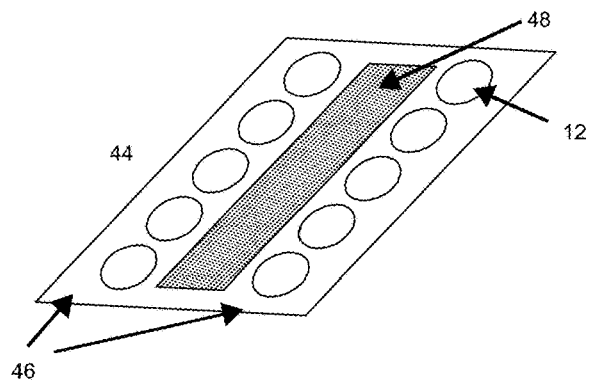
FIG. 7B shows a top view of an example configuration of a dispenser element of the apparatus of FIG. 7A.
Figure 7C:
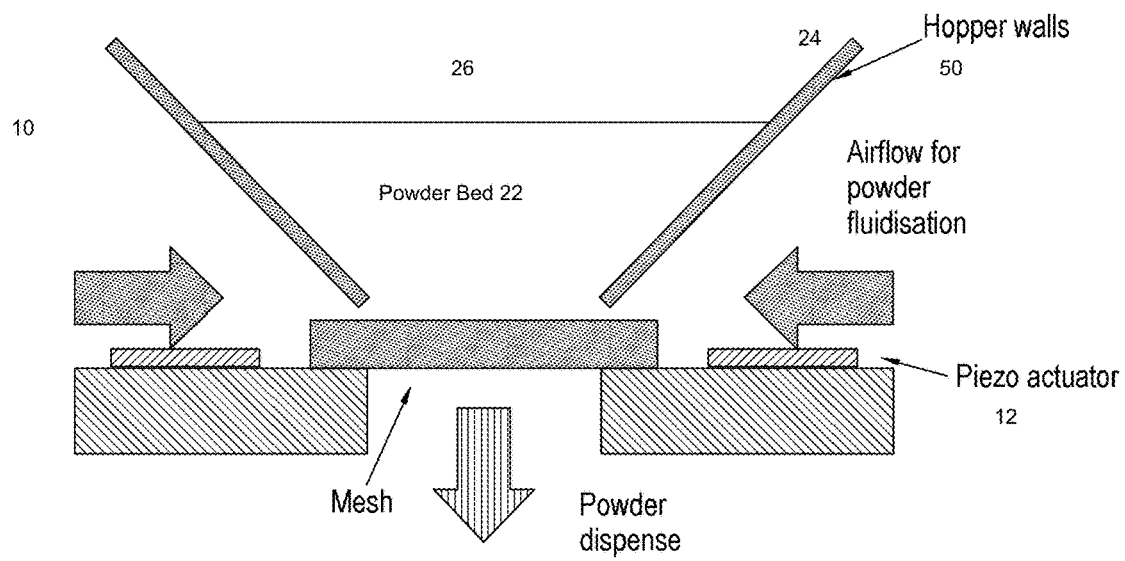
FIG. 7C shows a side view of the dispenser element of FIG. 7B.

FIGS. 7A to 7C show how a dispenser apparatus according to an embodiment of the present invention can be used in methods to laminate textiles by depositing thermoplastic adhesive powders.

In general, the technique involves a method where powders 20 are applied to a substrate and softened and melted in order to join multiple layers of fabric together. A key example of a suitable adhesive powder is thermoplastic polyurethane (TPU).

The application of a TPU powder shape 40 onto a fabric substrate has been demonstrated using a printhead 100 such as that illustrated in FIGS. 7A to 7C. Subsequently, the powder shape 40 was laminated by placing a second fabric layer on top and a hot roller was applied to soften the TPU powder inbetween and bond the two layers of fabric together. A benefit of the disclosed apparatus is that, since the piezo actuators can be controlled digitally, the shapes of powder which are dispensed can also be defined and controlled digitally, as opposed to known technologies which can only deposit full coverage coatings.

In the present example, a 30 cm wide rectangular dispenser 10 comprising a piezoelectric actuator driven assembly was used to dispense a repeating rectangular TPU powder layer 40 onto a polyester fabric substrate.

The active element 44 of the dispenser, which causes powder to be deposited and which is actuated by the piezoelectric assembly, comprises two strips of stainless steel 46, each 0.6 mm thick, 23 mm deep and located 10 mm apart from each other. The strips are bridged by a strip of woven steel mesh 48, the mesh having 2 mm overlap with each strip, being bonded with epoxy adhesive and having a pore size suited to the powder, e.g. 0.5 mm.

Each steel strip 46 is mounted with an array of PZT discs 12, each 15 mm diameter and 0.15 mm thick, along its length, and which are mechanically bonded to it. The PZT discs have an electrode on their uppermost surface, which are all separately electrically connected to a driving voltage source. In some embodiments the electrodes may also be jointly connected to a voltage source.

The active element 44 is held in place by silicone blocks to allow free vibration. The dispenser apparatus comprises a hopper 50 located above the active element 44, containing the powder to be dispensed (e.g: BASF Adsint TPU 90 flex TPU powder, Danthane Powder (DanQunisa Gmbh)). The bottom of the hopper 50 is close to but not contacting the active element 44. The walls of the hopper are solid. Inside the hopper walls is a volume 26 filled with pressurised air, e.g. 2 bar, that is sealed except for gaps between the hopper 50 and the active element 44 which allow air to flow out.

Air flows through gaps and fluidises the powder in the hopper 50, ensuring powder flows to the active element 44. A web of material passes under the dispenser, guided by rollers, that is the same width as the dispenser and 1-5 cm away from it. An adhesive powder is held in the dispenser, e.g. polyester powder with a D50=0.3 mm and D90=0.4 mm.

As a textile material passes under the dispenser, a periodic driving signal is applied to the piezo actuators such as that as described above, causing powder to flow through the mesh and fall onto the material of ~20 cm wide. The waveform is a 10 kHz square wave with a peak to peak amplitude of 50 V. The waveform is applied for periods of 5 ms with pauses of 5 ms between. The signal is continued until the desired length of textile material is coated with powder. The dispenser is typically on for 5 seconds and then off for 5 seconds (covering 30 cm strips at 6 m/min). A typical shape is a 20 cm×30 cm rectangle of TPU coating.

Application of a second layer of polyester fabric may be performed manually by placing the fabric onto the TPU coated substrate or adding a second web of material. For lamination, temperatures of ~100-120 C were used and 1 minute of heating was allowed to laminate the two-layer structure FIG. 8 shows another example application of an embodiment of the present invention in applying decorative powder coatings to a paper or card substrate.

Powder adhered to paper is commonly used to decorate paper products such as gift cards. The disclosed apparatus has been demonstrated to apply decorative powder onto regions of paper that have been pre-coated with an adhesive. In this example the powder dispenser was mounted onto an XY translator motion system and used to deposit powder onto a shape defined by an adhesive coating or to selectively deposit powder onto a substrate fully coated with adhesive.

A centro-symmetric circular dispenser was used, with the active element being a flat ring of stainless steel, with an inner diameter of 30 mm and a width of 25 mm. A disc of mesh, 35 mm in diameter, was soldered to the underside of the ring. In other aspects, the active element was the same in construction as that illustrated in FIGS. 7A to 7C, with actuation controlled using a series of PZT discs mechanically connected to the steel strip.

A conical hopper 50 is used in this example, the upper diameter of which is 50 mm and the lower diameter matches the inside of the element ring. The hopper sits on the mesh of the active element and is glued in place with silicone adhesive. A screw feeder provides fluidised powder material to the hopper at a flow rate that is matched to the dispense rate. The powder material is a decorative powder, e.g. glitter powder, with D50~200 microns. The screw feeder outlet is positioned over the middle of the dispenser. Typically the bottom of the feeder outlet is level with the top of the hopper The PZT discs on the active element are driven by a waveform as described in relation to the apparatus of FIGS. 7A to 7C. The waveform is applied to the single PZT discs as separately addressable elements. The pattern of activation of the discs is digitally controlled, and allows for additional functionality, such as progressively moving the activation around the ring to spread out material on the sieve.

Figure 9:
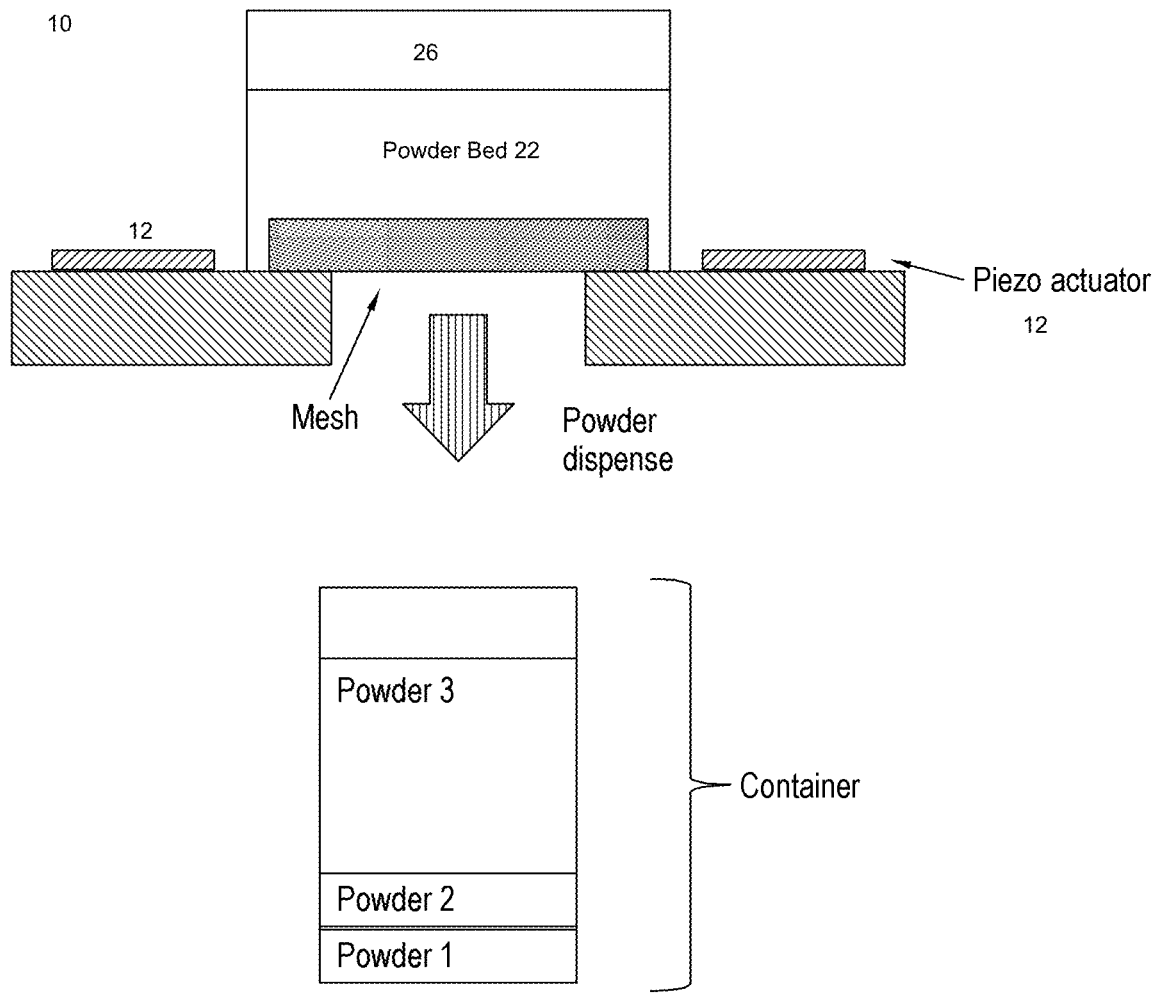
FIG. 9 shows an alternative example configuration of the apparatus of the present invention with a dispenser element suitable for depositing layers of powder into a container.

In an example deposition process, the dispenser is moved over a substrate at a fixed height above the substrate 32, which is a sheet of paper or card. The substrate is coated with adhesive, either entirely or only in some areas. The dispenser is moved in the horizontal plane, following a predetermined path that matches the adhesive pattern. The dispenser is active for some or all of the motion, depositing powder material in a shape determined by the motion of the dispenser in the horizontal plane. FIG. 9 shows another example application of an apparatus according to the present invention, wherein the apparatus is used to fill a container with powder.

There are numerous containers for powder used in food, consumer product and pharmaceutical industries. Embodiments of the present invention enable accurate, digitally controlled filling of containers with a powder mass with a precision of 5% and over a mass range 5 mg-50 g.

In the present example, the apparatus is used to fill containers with multiple types of cleaning powders for use in dishwashers. The deposition of multiple layers of different powders and thicknesses enables multiple functionalities to be delivered, with each powder layer defined in mass.

The apparatus comprises an array of separate dispensers, each dispenser containing an active element that is positioned above a container.

The active element is a single strip of stainless steel, 0.4 mm thick, 20 mm wide and 50 mm long. The strip has an array of hexagonal holes at its centre, each hole being 1 mm across its flat sides with 0.5 mm spacing. The holes cover a circular area 17 mm in diameter. A rectangle of PZT material, 15×20 mm, is soldered to each end of the strip and is configured to actuate the strip upon energisation.

A feed tube (not illustrated) is used to deliver powder to the dispenser element 10. The feed tube is made of polypropylene, with an outer diameter of 16 mm and a wall thickness of 1 mm. The feed tube is pressed against the centre of the active element, held by the casing. The feed tube is filled with powder, e.g. spray-dried laundry detergent, with particle sizes in the range of 200 to 800 micrometres.

The tube is filled by a pneumatic powder conveyance system. In an example configuration, a high-speed stream of air carries powder from a source container. Near the dispenser 10, the powder is slowed down so that it falls out of the air stream and settles in the dispenser hopper. The powder may be slowed either by widening the channel containing the air stream, slowing the air and powder together, or by sharply turning the air stream, so that the powder hits the channel walls and is slowed directly, e.g. a cyclonic separator.

While aligned with a tool plate, the dispensers 10 are activated. The dispensers are driven by a waveform, which is a sine wave at 12 kHz with a peak-to-peak amplitude of 300 V. The activation may last the entire time the carriage is over the tool plate or for only a portion of it. Multiple dispensers 10 may be employed in line to dispense multiple powders. Each dispenser 10 can be configured to deposit a different material into the pockets of the tool plate. This allows for variation in composition, e.g. different scents, layers of different functionalities. The amount of powder deposited by each carriage may be changed for every dispense.

Energy Controlled Fluidised Powder Chamber

The fluidization of powders with air as described above requires knowledge of the minimum fluidization velocity of the particular powder used. The minimum fluidization velocity is the velocity which the introduced air or gas must obtain in order for fluidization to occur. The minimum fluidization velocity of powders which fall under the Geldart A classification may be calculated using the following equation:

$$U_{mf} \approx 420 \rho_p d^2 v$$

where Umf=minimum fluidization velocity (m/s),
$\rho_p$=bulk density of the powder (g/m$^3$),
$d_v$=mean particle diameter based on volume (m); and
420=an empirical value for particles in air (m$^2$/g-s).

Providing that the minimum fluidisation velocity is met, a fluidised powder bed can be created with variable energy. The energy being controlled using airflow, vibration, piezoactuators or other mechanisms. This fluidized powder reservoir is placed in intimate contact with an array of piezoactuator controlled dispenser elements. When the fluid dispenser element is "off" or below the Umf (minimum fluidization velocity) powder cannot flow through the dispenser element because the dispenser is configured to provide a resistance which lowers the energy of the powder from passing through without the additional energy from the piezoelectric actuators. When the fluid dispenser element is "on", causing the fluidized powder to have a velocity above the Umf, the powder is able to flow through the dispenser. Typical powders that may be used in this system are decorative pigments such as metallics, foodstuffs such as powdered flavours and pharmaceutical formulations including active pharmaceutical ingredients mixed with lactose.

Two-Stage Piezoactuated Powder Feeding System

The mass of powder delivered to the powder dispenser array can also be controlled using a piezo-actuated powder feeding system. This enables powder to be delivered to the dispenser under better controlled conditions and at a flow rate that is matched to the primary dispenser. This two-stage powder dispensing system is most preferably configured such that a piezo-actuated sieve array is used as the first stage in the powder feeding mechanism and that the second stage is either an array of piezo actuated sieves or orifices. An alternative option for the first stage is to use a stirrer to agitate the powder to minimize agglomeration and ensure free flowing transport to the dispenser stage.

Piezoactuated Powder Dispenser Array

The array of dispensers comprises a number of orifice constructions that are mechanically coupled to a piezoelectric transducer. The piezoelectric transducers deliver high frequency (>1 kHz) vibratory energy to the system when driven using a typical electrical signal, such as an alternating voltage. The dispenser element typically consists of the following construction:

1. An orifice or a number of orifices, which provide a resistance to powder flow
2. A piezo actuator that acts to:
   a. Create a valve that can be open or closed
   b. Overcome the resistance to powder flow by adding vibrational energy to powder within the dispensing element The dispenser element may be composed of structures, such as:

1. A linear tube, wherein a piezo-actuator is mechanically attached to the tube.
2. A cone, wherein the piezo-actuator is attached to the outside of the cone and acts to dispense the powder within the cone
3. Valve elements, such as trap-door elements that can be opened and closed using a piezo actuator
4. A structure such as a planar array of holes, such as a sieve mesh. The individual dispenser elements are defined via a mechanical interface that addresses each unique dispenser using a single, or multiple piezo actuators.

a. An array of dispensers can be created from a single continuous sheet of sieve mesh, wherein individual elements are addressed by a unique piezo actuator.

The dispensing process may require gravity to transfer the dispensed powder from the dispenser element to the substrate.

The invention claimed is:

1. A digitally controlled powder deposition apparatus, comprising:

a supply chamber comprising a container configured to hold a reservoir of powder and to impart kinetic energy to the reservoir of powder to maintain it in a fluidised state;

an array of digitally controlled and individually controllable dispenser elements, each comprising a piezo actuator and an orifice, the orifice being configured to resist a flow of fluidised powder having an energy below a first energy level; and a controller configured to digitally control the actuation of the piezo actuators to cause the fluidised powder to be dispensed from either a single dispenser element or multiple dispenser elements of the array;

wherein the supply chamber is in contact with the array of dispenser elements and configured to direct a flow of the fluidised powder from the reservoir to the orifice, the flow comprising a portion of the fluidised powder having an energy below the first energy level; and wherein, upon actuation of the piezo actuator by the controller, each dispenser element of the array is further configured to impart additional kinetic energy to the portion of the fluidised powder via the piezo actuator, such that the portion of the fluidised powder is provided with an energy equal to or above the first energy level, causing it to be dispensed from the orifice.

2. The apparatus of claim 1, wherein the energy is provided to the portion of the fluidised powder via a direct mechanical connection between the piezo actuator and the orifice.

3. The apparatus of claim 1, further comprising a conduit configured to transmit mechanical vibrations from the piezo actuator to the flow comprising the portion of the fluidised powder.

4. The apparatus of claim 3, wherein the conduit is a tube, a trough or an array of holes in a sieve.

5. The apparatus of claim 1, wherein energy is delivered with a frequency in the range of 1-500 kHz.

6. The apparatus according to claim 1, in which the orifice is an array of holes in a plate.

7. The apparatus according to claim 1, wherein the orifice is a straight sided cylinder.

8. The apparatus according to claim 1, wherein the supply chamber includes a mechanical agitator configured to impart kinetic energy to fluidise the powder.

9. The apparatus according to claim 1, wherein the apparatus further includes an air supply or flow pump configured to impart kinetic energy to fluidise the powder.

10. The apparatus according to claim 1, wherein the supply chamber includes an ultrasonic actuator configured to impart kinetic energy to fluidise the powder.

11. The apparatus according to claim 1, wherein the diameter of the orifice is in the range of 50-1000 microns.

12. The apparatus according to claim 1, further comprising a software control system configured to convert an image or pattern into discrete signals for actuating the piezo actuators of the array of dispenser elements.

* * * * *